United States Patent [19]

Remmel

[11] Patent Number: 4,862,552
[45] Date of Patent: Sep. 5, 1989

[54] KNOB WITH STAINLESS STEEL CAP
[75] Inventor: Wayne R. Remmel, Kewaskum, Wis.
[73] Assignee: Regal Ware, Inc., Kewaskum, Wis.
[21] Appl. No.: 161,520
[22] Filed: Feb. 29, 1988
[51] Int. Cl.⁴ .................. A47J 45/06; A47J 45/08
[52] U.S. Cl. ........................... 16/118; 16/121; 16/DIG. 30; 99/344
[58] Field of Search ............... 16/118, 121, DIG. 30; 99/342, 344; 126/388

[56] References Cited
U.S. PATENT DOCUMENTS

| | | | |
|---|---|---|---|
| 1,759,771 | 5/1930 | Willi | 16/121 |
| 2,026,701 | 1/1936 | Pearl | 16/118 |
| 2,209,644 | 7/1940 | Colby | 16/118 |
| 4,418,637 | 12/1983 | Heermans | 99/344 |
| 4,776,296 | 10/1988 | Heermans | 99/344 |

FOREIGN PATENT DOCUMENTS 235666 6/1925 United Kingdom .................. 16/118

Primary Examiner—Nicholas P. Godici
Assistant Examiner—William Scott Andes
Attorney, Agent, or Firm—Wheeler Law Firm

[57] ABSTRACT

A knob for the lid of a cooking vessel. The knob being made of heat sensitive material and having a metal cap covering the portion of the knob that is exposed on the underside of the cooking vessel lid.

2 Claims, 1 Drawing Sheet

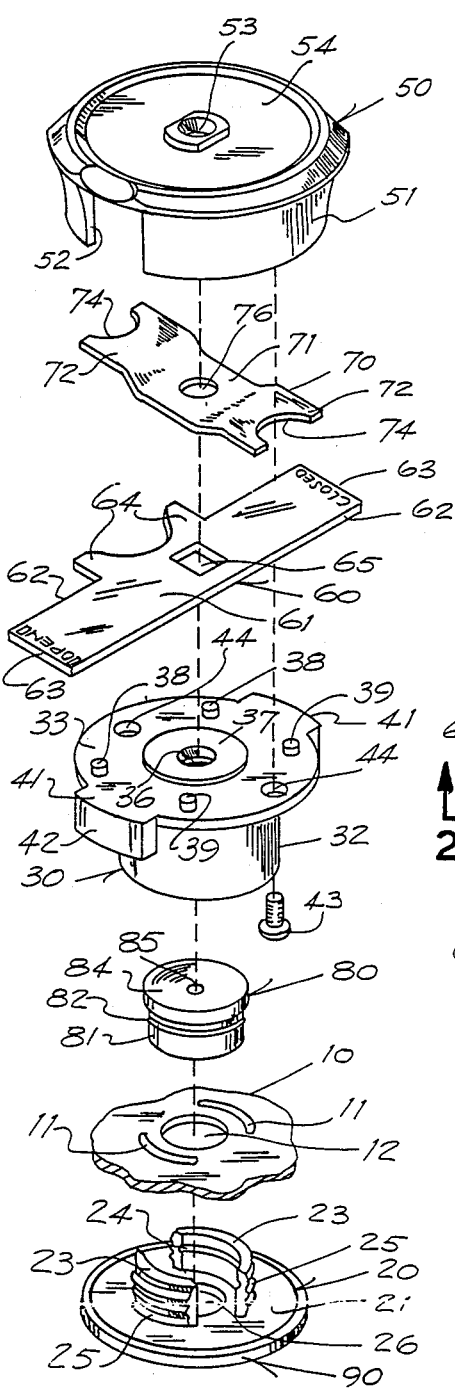
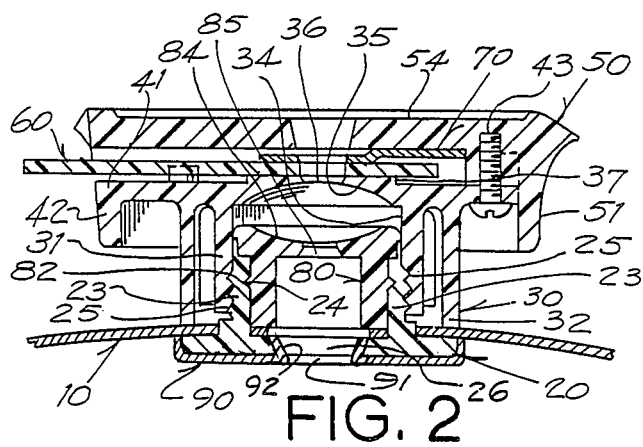
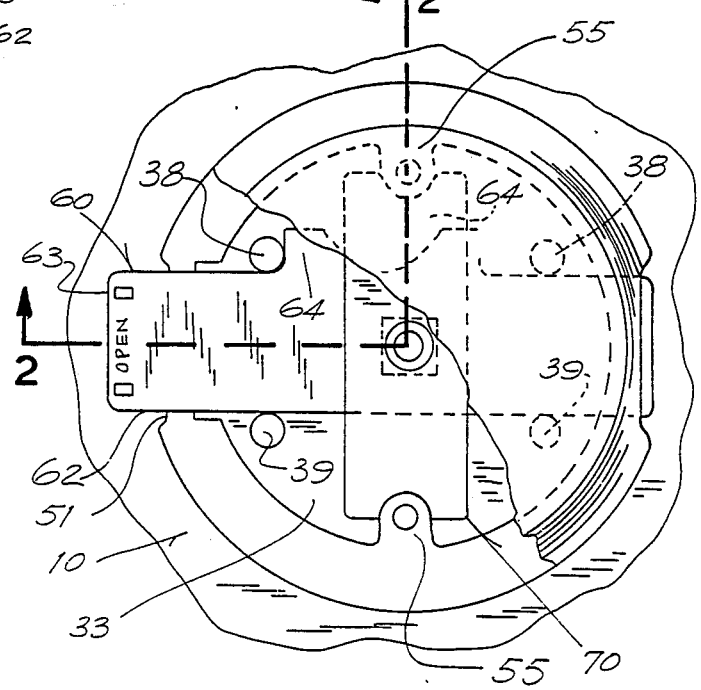
FIG. 1
FIG. 2
FIG. 3

KNOB WITH STAINLESS STEEL CAP

BACKGROUND OF THE INVENTION

The present invention relates to the field of cooking and specifically to cooking vessels which are used on top of a stove or some other heat source. Generally, pots and other cooking vessels are used on top of a stove while preparing a meal. Depending on the type of procedure followed by the cook, a lid may be used or placed on top of the pot or other cooking vessel to contain the heat within the vessel. The procedure followed when preparing a meal using a pot is varied from person to person; some people prefer to add the water or food item that is to be prepared to the pot or cooking vessel before applying heat, while others prefer to turn the heat on prior to the addition of water or the food that is to be prepared. When a pot is heated without any water or food in it the heat that would have normally transferred itself to the food remains in the pot; greatly increasing the temperature of the pot. When a lid is left on a pot that is being heated in this manner, the heat that is transferred to the knob is significantly higher than that which would have been transferred had there been food in the pot. As a result, knobs which protrude through the lid of the pot are subject to a great deal of heat. This creates a problem when the protruding portion of the knob is made of a material that does not stand up to heat well; many common moldable plastics are such materials.

The present invention is designed to protect such a protrusion of a knob through the lid of a pot from excessive heat by means of a heat resistant cap. A number of devices are known to the inventor which cover the base of a knob that protrudes through a lid of a cooking utensil or the panel of a drawer. See, for example, U.S. Pat. No. 302,929 (Musgrove) in which a metal cap is used to strengthen a wooden knob and to allow it to be soldered on to a metal pan lid or U.S. Pat. No. 1,601,160 (Busch) which shows a knob with a cap, the purpose of the cap being to prevent rotation and distortion of knobs used in connection with handles on the exteriors or doors, panels or drawers. See also, U.S. Pat. No. 2,511,682 (Allen), in which a large metal cup on the underside of the cover of a cooking vessel is shown, the purpose of the cup being not to protect the knob but to condense the steam before it escapes from the pot through openings in the lid, thereby controlling the rate of vapor escape; a similar structure is shown in the same patent, but that structure is attached to the top side of the pan lid and functions to protect the cook or user from the steam which is escaping through openings in the pan lid. None of the structures shown are designed to protect the knob and help it retain its shape because the knob is entirely outside the pan lid. The same is true of many of the other structures described in the prior art and known to the inventor. None of the prior art caps and back plates known to the inventor are arranged to protect a knob that has a portion of its structure exposed on the underside of the lid of a cooking vessel from the heat which builds up inside the vessel when it is used.

Other related references known to the inventor include U.S. Pat. No. 1,629,773 (Bossung), U.S. Pat. No. 2,002,466 (Belden), U.S. Pat. No. 2,092,932 (Rosenthal), U.S. Pat. No. 2,100,567 (Nelson), U.S. Pat. No. 2,590,395 (Fry), U.S. Pat. No. 3,148,406 (Freiman), U.S. Pat. No 3,174,178 (La Branche, et al.), and U.S. Pat. No. 3,252,404 (Cox).

SUMMARY OF THE INVENTION

The present invention is the combination of a metal cap with the lid of a cooking vessel and the knob attached to the lid of that vessel; such that the combination of the knob and the lid leaves a portion of the knob exposed on the underside of the lid. The metal cap, by means of its unique and simple design, is attached to the exposed portion of the knob; covering the knob so that the underside of the lid and the edges of the cap are flush against one another.

The metal cap now covers the exposed portion of the knob. This shields the knob from the heat that the cooking vessel interior is exposed to when it is used and supports it so that it cannot change shape. By shielding the knob in this manner, the knob is able to withstand a higher temperature for a longer period of time without deforming, melting or suffering some other undesirable affect that prolonged exposure to high temperatures may have on the knob. Therefore, a cooking vessel lid and knob that are equipped with the metal cap may be used in both water and waterless cooking applications. These and other benefits of the present invention will be apparent to one skilled in the art from the following description.

DRAWINGS

In the drawings, FIG. 1 is an exploded perspective view of the parts of my knob with a stainless steel cap.

FIG. 2 is a cross-sectional view of the knob and the stainless steel cap and of the vessel top in which it is installed taken along line 2—2 in FIG. 3.

FIG. 3 is a top view of the knob with the parts broken away.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

As best shown in FIG. 1, the top of a cooking vessel 10 is provided with two arc segment openings 11 and a circular opening 12 to which the various parts of the knob of my invention are mounted. These consist of an inner knob base 20, an inner knob top 80, an outer knob 30, a knob cover 50, a valve slide 60, a leaf spring 70, and a metal cap 90.

The inner knob base 20 is attached to the metal cap 90 and consists of a lower flange 21, two arc segment portions 23 to complementarily fit the arc segment openings 11 in the vessel 10, and a small circular opening 26. The attached cap 90 has a similar circular opening 91 in direct alignment with opening 26; although it should be noted that if the knob 50 had no opening 26 then the metal cap 90 would have no opening 91 and would form a continuous shield across the bottom of the inner knob base 20. The metal cap 90, in the preferred embodiment of the invention, is attached to the inner knob base 20 by means of swaging the flange 92 around the opening 91 of the metal cap 90 onto the edges formed by opening 26 of the knob base 20; the cap 90 thereby becoming a permanent part of the knob base 20. The two arc segment portions 23 have threads 25 on their outside surfaces and each has a groove 24 on its inside surface. The inner knob top 80 consists of an outer skirt 81 which has a thin ridge 82 around its circumference and a lower resonance chamber portion 84 surrounding a whistle orifice 85 having a form suited to generate a tone when vapor passes through it when the cooking vessel is heated with some liquid in it. Orifice 85 is better shown in FIG. 2. The inner knob top 80 is fixed in place by inserting the inner knob 80 between the arc segment portions 23 of the inner knob base 20 which projects through the vessel lid 10 and is covered completely by the metal cap 90. The exterior ridge 82 on the inner knob top 80 and the interior groove 24 on the arc segment portions 23 engage each other snapping the inner knob top 80 in place as shown in FIG. 2. Preferably, when the inner knob top 80 is snapped in place, its skirt 81 abuts the cooking vessel 10 through opening 91 of the metal cap 90.

Outer knob 30 desirably consists of an inner skirt 31 adapted to screw on to the threads 25 of the arc segment portions 23 of the inner knob base 20, an outer skirt 32 which bears on the vessel 10 when outer knob 30 is screwed into place, a horizontal valve supporting surface 33, resonance chamber sidewall 34 and resonance chamber upper wall 35, a second whistle orifice 36 in the center of the resonance chamber upper wall 35 and directly above the first orifice 85 in the assembled position, and slide guide abutments 38 and 39. At diametrically opposite positions on valve supporting surface 33 the outer knob 30 is provided with slight projections 41, each provided with a depending tab 42 which underlies the slide valve path and becomes part of the knob cover 50, which aligns it for non-rotatable assembly by means of screws 43. The knob cover 50 is provided with a depending skirt 51 extending entirely around the knob and enclosing the sides of the depending tabs 42 of the upper knob 30 with the cut-out portions 52, so that when the knob cover 50 is placed onto the upper knob body it is automatically aligned to receive screws 43 which secure the upper knob body to the knob cover 50 through holes 44. Knob cover 50 has an orifice 53 in the center of the upper wall 54 and aligned with orifices 85 and 36. Knob cover 50 also has bosses 55 depending from the underside of its upper wall 54 within the margin of skirt 51 to receive screws 43 and to assist in locating valve spring 70. Bosses 55 are shown in FIG. 3. The relieved portions 52 in skirt 51 in addition to forming keys to receive paths 42 for non-rotatable alignment also serve in their upper portion as part of the valve slide path. Ends of the valve slide means 60 project there from so that they may be manipulated, as will be described later. Valve slide 60 rests on boss 37 and is moveable along a valve slide means path extending from one surface extension 41 to the opposite projection 41 between slide guide abutments 38 and 39, along a chord of the knob, preferably a diameter.

Valve slide means 60 consists of a valve member having a pair of long sides 62 and a pair of ends 63. One of the long sides 62 is provided with a pair of sidewardly extending abutments 64 which are spaced apart a distance along the slide valve path which is sufficiently less than the distance between the slide stop abutments 38 and 39 in the same direction for whistle orifice 65 to be moved in the direction of the valve slide path to a first position over orifice 36 and to a second position completely unaligned with orifice 36. For that purpose it is preferable that orifice 65 not be in the exact center of rectangular body 61 but be spaced slightly from the center in the direction parallel to long side 62 into the valve slide path.

Leaf spring 70 is a generally rectangular member made of any suitably resilient and heat resistant material such as spring stainless steel. It has a depressed central portion 71, a raised wing 72 at each end, a forked end 74 in each wing to locate spring 70 between the bosses 55 depending from knob cover 50, and a central orifice 76 positioned coaxially of orifices 85, 36 and 53 when the knob is assembled. The leaf spring biases valve slide means 60 away from upper wall 54 and to engagement with boss 37, so that the valve slide is always biased into good contact with the boss 37 and provides an effective seal when the valve is closed. The exact amount of bias can be varied by changing the dimension of or material of leaf spring 70; the bias should be sufficient to create a seal and maintain the selected position of slide 60, but not so great as to distort the valve slide or prevent the slide from being operated to open or close the valve. Thus, in the present embodiment valve means are defined by valve supporting surface 33, whistle orifice 36, boss 37, valve slide means 60 and the parts 62 through 65 thereof, and leaf spring 70 varying between upper wall 54 and valve slide means 60. These parts cooperate together to regulate the flow of a gas such as air between whistle orifice 36 and the exterior of the knob according to the position of the valve slide means 60 and the previously defined valve slide path. When my knob is assembled as shown in FIGS. 2 and 3, one of the ends 63 of valve slide means 60 will project through one of the relief portions and knob portion 50 will preferably bear a legend indicating whether the valve was opened or closed. It may be slid along the valve path by finger pressure on the exposed end 63 to push that end flush with knob skirt 51 and expose the other end 63, thereby opening or closing the valve. The valve construction described is simply made, readily cleaned and reassembled, and keeps the fingers of the user away from escaping steam, unlike earlier structures.

As a whistle, the knob presents a series of orifices 85, 36, 65, 76, and 53 separated by a resonance chamber consisting of a lower resonance chamber portion 84 in inner knob top 80, and resonance chamber sidewall 34 and resonance chamber wall 35 in the outer knob 30, which form a very effective whistle. The remaining three orifices are not a part of the whistle, as such but provide a valve and an escape path respectively. When food is being heated in a vessel, a temperature is reached at which water vapor is generated and passes through orifices 85 and 36 and the intervening resonance chamber, creating a whistling sound to warn the cook that the temperature should now be reduced for effective waterless cooking. The valve slide 60 is then moved from the open position shown in FIG. 2 to its closed position in which orifice 65 is displaced with respect to orifice 36, by pushing on the projecting end 63 of the valve slide which is at the left in FIG. 3 until the other abutment 64 strikes the corresponding slide stop abutment 38. The top or lid of a cooking vessel 10 in which the knob is located is now completely sealed and will retain the vapor within the pan to seal in the flavors and moisture. Such cooking is well-known.

However the presence of the whistle orifices in the resonance chamber of my knob offer the possibility of contamination by volatile food substances, or even by solids passing through orifice 85. In any case it is important to be able to attain complete cleanliness in the knob.

As best shown in FIG. 1, by removing the entire outer knob 30, spring 70, slide 60, and knob cover 50 by unscrewing them from inner knob base 20, and by unsnapping inner knob top 80 from inner knob base 20, the entire knob may be removed from vessel 10. It will be noted that although pressure can be applied only to knob cover 50, the reliefs 52 serves to prevent relative rotation, as do screws 43, and apply the pressure to tabs 42 of the upper knob body, carrying it along as the cover 50 is rotated. Because the openings 11 do not allow the knob base 20 to be rotated once the arc segment portions 23 are inserted through the openings 11, it is easy to turn the upper portion while the lower portion remains stationary. Inner knob top 80 may then be unsnapped, releasing the knob base also. The only remaining step to completely disassemble the knob, if that is necessary, is to remove the two screws 43. These have been exposed once the outer parts of the knob are removed, but are concealed in insulative plastic when the knob is assembled.

When the slide 60 and the spring 70 are in place on outer knob 30 cover 50 is placed over them being guided by tabs 42 and reliefs 52 into a position so that screws 43 are perfectly in line for insertion. With screws 43 in place the entire outer part of the knob is unitary. The arc segment portions 23 of knob base 20 may then be inserted in vessel top 10 through openings 11, the inner knob 80 may then be snapped into place between the arc segment portions 23, and the outer knob part may be screwed unto threads 25, whereupon skirt 32 bears on vessel 10 above flange 21 to give a very secure anchorage.

It will be seen from FIG. 2 that while the parts are assembled, the combination of the metal cap 90 and the lid 10 covers the inner knob base 20; protecting the inner knob base 20 from the heat generated within the cooking vessel as it is being used on top of a stove or other heat source and retaining it in the proper shape.

What is claimed is:

1. In a cooking utensil comprising, a lid, a knob made of heat sensitive material and a metal cap; said lid having a top side, a bottom side and an opening to receive said knob; said knob comprising a base extending through said opening and extending below said bottom side of said lid; the improvement comprising;
    said cap being attached to said base of said knob which extends below said bottom side of said lid, said cap being formed so that said cap completely covers an exposed lower surface of said knob base and the edges of said cap are flush with the surface of said bottom side of said lid;
    said cap having an opening, said knob base having an opening;
    said opening in said knob base located at the lower surface of said knob base;
    said cap having a flange surrounding said knob base opening;
    said flange being secured to said cap around said cap opening; said flange extending into said knob base opening and said cap being attached to said base by means of swaging said flange over the edges formed by said opening in said base.

2. The device of claim 1 in which said knob has a passage;
    said passage extends from the top of said knob to said base of said knob;
    said passage being tapered;
    the narrowest portion of said tapered passage being located at said lower surface of said base of said knob;
    said flange of said cap being swaged over the edges of said narrowest portion of said passage.

* * * * *